United States Patent [19]
Ando

[11] Patent Number: 4,944,037
[45] Date of Patent: Jul. 24, 1990

[54] OPTICAL SYSTEM FOR RECORDING INFORMATION IN ERASABLE AND NON-ERASABLE MODES

[75] Inventor: Hideo Ando, Tokyo, Japan

[73] Assignee: Kabushiki Kaisha Toshiba, Kawasaki, Japan

[21] Appl. No.: 125,815

[22] Filed: Nov. 25, 1987

Related U.S. Application Data

[63] Continuation of Ser. No. 819,706, Jan. 17, 1986, abandoned.

[30] Foreign Application Priority Data

| Jan. 18, 1985 | [JP] | Japan | 60-6757 |
| Mar. 8, 1985 | [JP] | Japan | 60-46019 |
| Mar. 27, 1985 | [JP] | Japan | 60-62324 |

[51] Int. Cl.$^5$ .................. G11B 13/04; G11B 11/12
[52] U.S. Cl. .................... 369/13; 369/100; 369/116
[58] Field of Search ............ 369/13, 14, 100, 54, 369/58, 284, 286, 275, 116; 365/113; 346/76 L, 135.1, 137; 235/487

[56] References Cited

U.S. PATENT DOCUMENTS

| 3,665,425 | 5/1972 | Feinleib | 365/113 |
| 3,820,087 | 6/1974 | Chaudhari et al. | 365/113 |
| 4,238,808 | 12/1980 | Tomita | 360/96.1 |
| 4,363,116 | 12/1982 | Kleuters et al. | 369/30 |
| 4,376,887 | 3/1983 | Greenaway et al. | 235/487 |
| 4,451,914 | 5/1984 | LaBudde et al. | 369/288 |
| 4,467,383 | 8/1984 | Ohta et al. | 369/275 |
| 4,566,088 | 1/1986 | Yoshida et al. | 365/113 |
| 4,598,395 | 7/1986 | Smith | 369/100 |

FOREIGN PATENT DOCUMENTS

| 2944744 | 6/1979 | Fed. Rep. of Germany . | |
| 52-050702 | 4/1977 | Japan | 365/113 |
| 56-25273 | 8/1981 | Japan . | |
| 57-78653 | 5/1982 | Japan . | |
| 57-195389 | 12/1982 | Japan . | |
| 2079031 | 1/1982 | United Kingdom . | |

OTHER PUBLICATIONS

Yamada et al., "Erasable Optical Disc Using TeO$_x$ Thin Film", Proceedings of Japan Display '83, pp. 40–48.
Welber et al., IBM Tech. Dis. Bulletin, vol. 15, No. 15, Oct. 1972, pp. 1588–1589.
Weiser, IBM Tech. Dis. Buttetin, vol. 15, No. 7, Dec. 1972, p. 2096.
Terao et al., "Chalcogenide Thin Films for Laser-Beam Recordings by Thermal Creation of Holes", J. Appl. Phys. 50(11), Nov./1979, pp. 6881–6886.
Japanese Patent Disclosure (Kokai), No. 60-32149.
Japanese Patent Disclosure (Kokai), No. 51-95807.

Primary Examiner—Steven L. Stephan
Assistant Examiner—Hoa Nguyen
Attorney, Agent, or Firm—Finnegan, Henderson, Farabow, Garrett, and Dunner

[57] ABSTRACT

In an optical system for recording information on an erasable recording medium, first and second pulse recording laser beams can be emitted from a laser unit. The first laser beam is converged by an objective lens onto a recording layer of an optical disk to form a permanent recorded region on the recording layer. The second laser beam, which has a lower intensity than that of the first laser beam, is also converged onto the recording layer by the objective lens onto the recording layer to form an erasable recorded region on the recording layer. Thus, the erasable and permanent recorded regions are formed in the recording layer.

9 Claims, 12 Drawing Sheets

FIG. 8
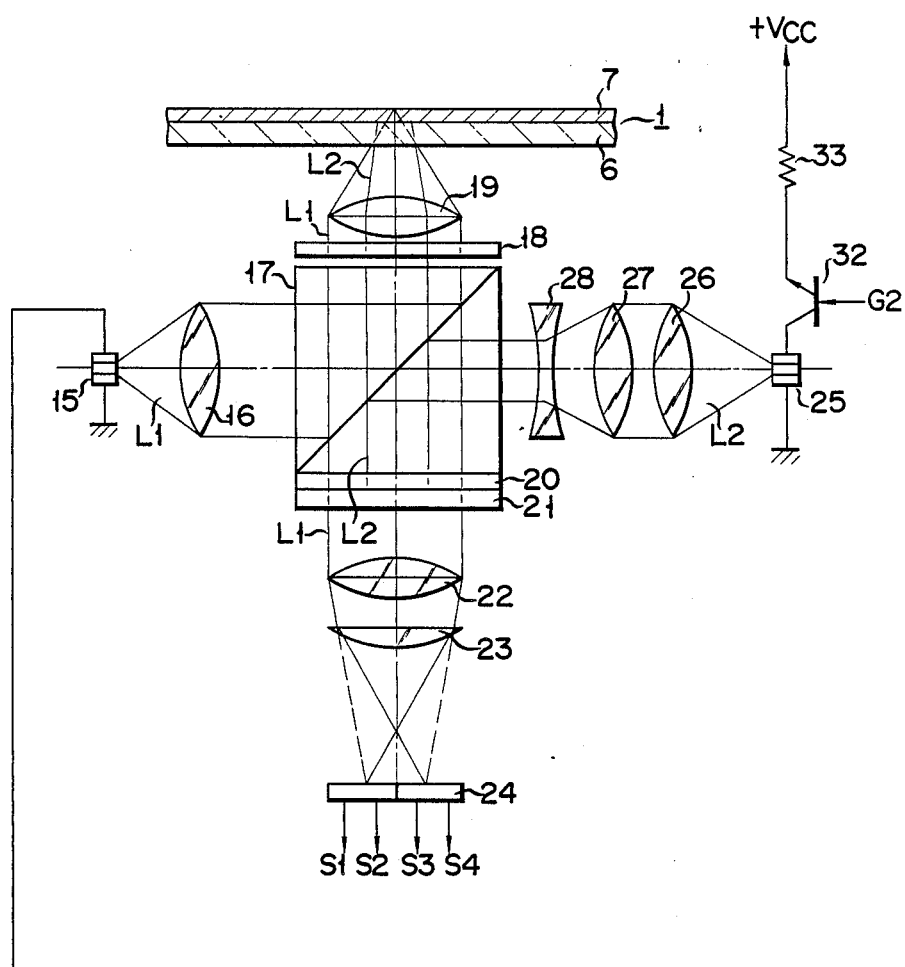
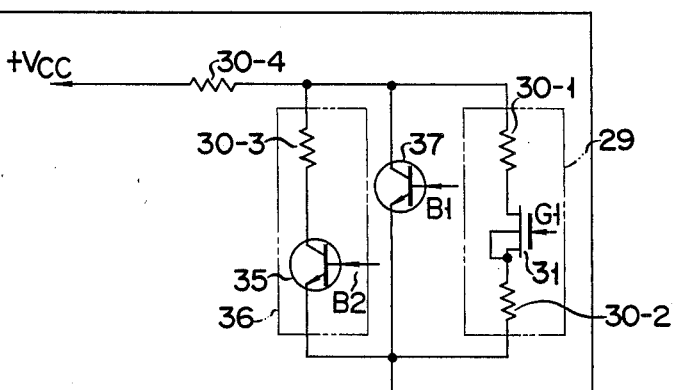

FIG. 15
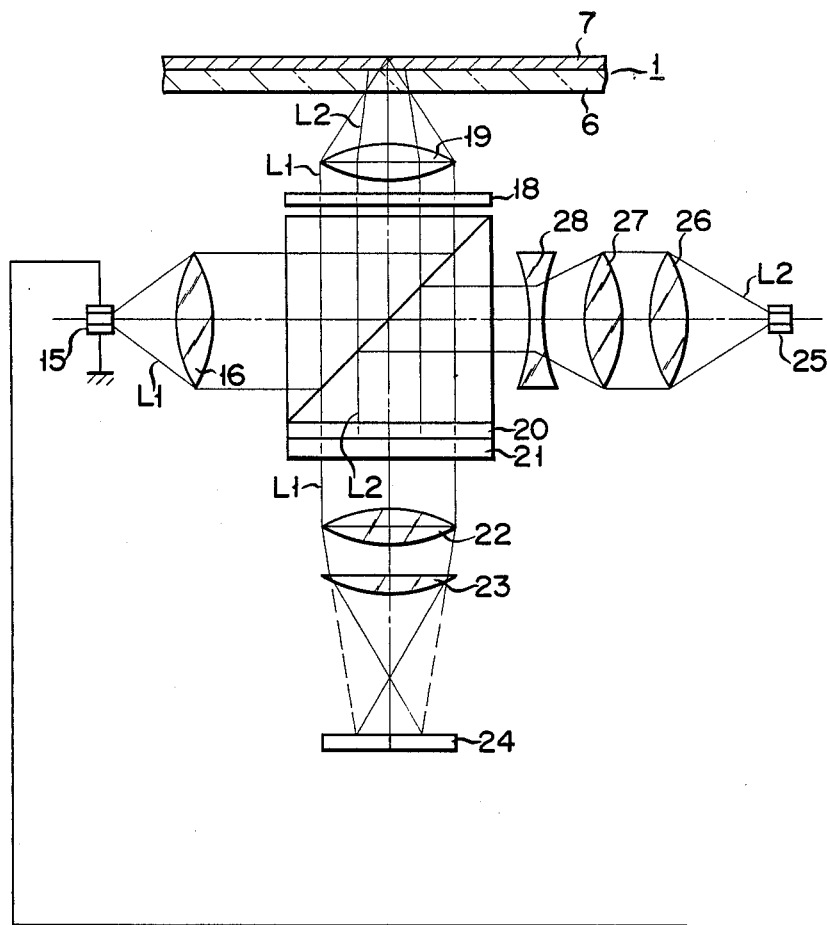
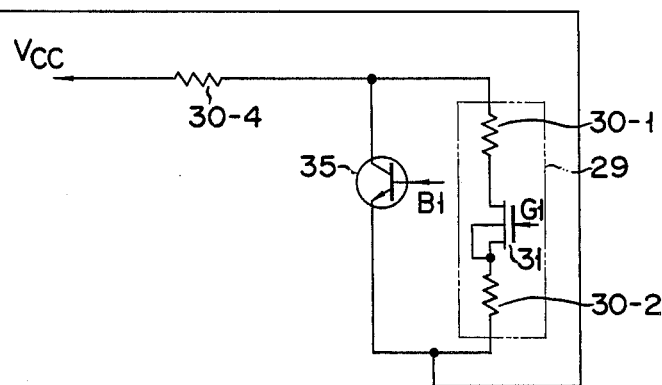

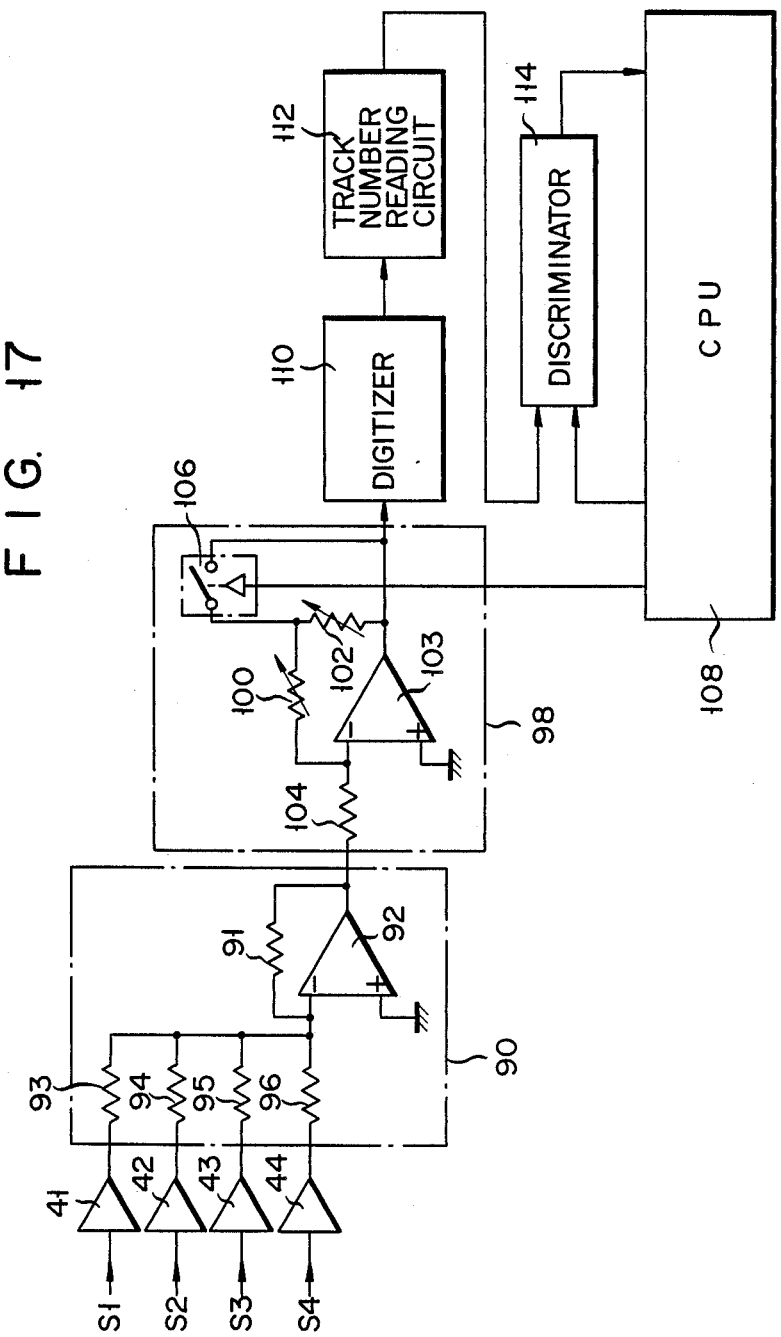

OPTICAL SYSTEM FOR RECORDING INFORMATION IN ERASABLE AND NON-ERASABLE MODES

This application is a continuation of application Ser. No. 06/819,706, filed Jan. 17, 1986, now abandoned.

BACKGROUND OF THE INVENTION

The present invention relates to an optical system for recording information in an optical recording medium with a converged light beam and for reproducing it therefrom.

In some recent optical recording media, information can be recorded with a converged laser beam, reproduced therefrom, and erased.

User information to be recorded in the information recording medium includes temporal data and permanent data. Temporal data is recorded and is erased when such data is not necessary, and new data is recorded in the information recording medium. Alternatively, rough data is temporarily recorded, and is partially updated later. Permanent data includes "manufacture number and date of information recording medium", "data index", and "classification items of contents to be recorded", which must not be erased.

Conventional information recording media are classified into media only with an information erasable region or media only with a nonerasable region. However, no conventional information recording medium has both erasable and nonerasable regions. Therefore, when a user wishes to record temporal and permanent data in information recording media, he must use two types of information recording media, resulting in inconvenience.

SUMMARY OF THE INVENTION

It is an object of the present invention to provide an optical system for recording erasable information and erasing it, and at the same time recording nonerasable information.

It is another object of the present invention to provide an optical recording medium for recording erasable and nonerasable information.

In order to achieve the above and other objects of the present invention, there is provided an optical system for recording information on an erasable recording medium, comprising:
  means for emitting one of first and second light beams;
  means for directing a light beam from the emitting means toward the recording medium; and
  energizing means for generating first and second energizing signals to energize the emitting means, the first energizing signal being supplied to the emitting means to cause the emitting means to emit the first light beam so as to form a permanent recorded region on the recording medium, the second energizing signal being supplied to the emitting means to cause the emitting means to emit the second light beam so as to form an erasable recorded region.

BRIEF DESCRIPTION OF THE DRAWINGS

FIG. 8 is a schematic view showing an optical head which is applied to the information recording medium for performing recording using crystal phase changes and which can change exposure levels corresponding to the recorded states according to an embodiment of the present invention;

FIGS. 15 and 16 are respectively block diagrams of optical heads according to other embodiments of the present invention; and FIG. 17 is a block diagram of a modification including a circuit for comparing the reproduced or erased region with a region to be reproduced or erased.

DETAILED DESCRIPTION OF THE PREFERRED EMBODIMENTS

Figure 1:
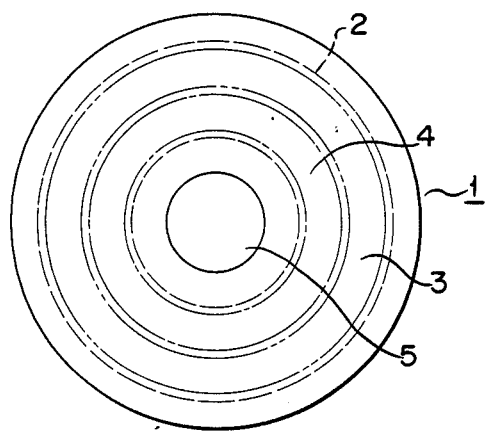
FIG. 1 is a plan view of an optical disk exemplifying an information recording medium according to the present invention.
Figure 2:
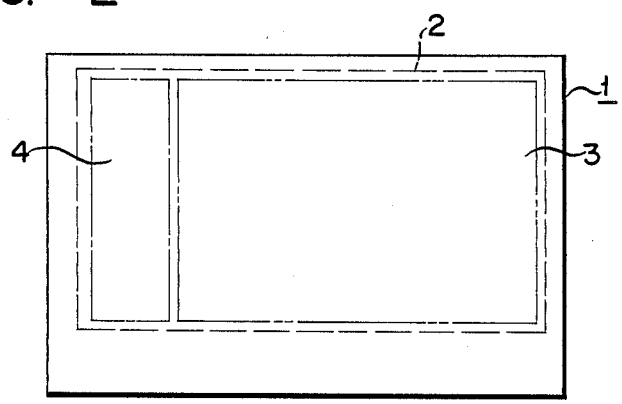
FIG. 2 is a plan view of an optical card exemplifying another information recording medium according to the present invention.

FIG. 1 shows disk-like information recording medium or optical disk 1, and FIG. 2 shows card-like information recording medium or optical card 1. Each medium 1 has information recording region 2 consisting of first recording region 3 for storing information erasable with a converged light beam and second recording region 4 for storing nonerasable information. Erasable information such as general data is stored in region 3, and permanent data such as index data and the manufacture number of the information recording medium is recorded in region 4. Reference numeral 5 denotes a central hole of optical disk 1.

Both temporal or erasable data and permanent or nonerasable data can be recorded in the single information recording medium described above.

The process for arbitrarily dividing region 2 into regions 3 and 4 will be described hereinafter.

Figure 3:
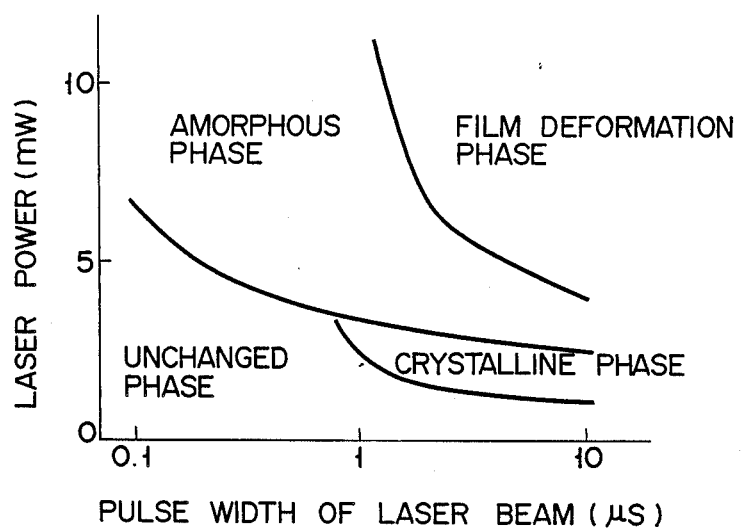
FIG. 3 is a graph showing the relationship between the laser power and the laser pulse width in the recording mode for recording information using a transition between the crystalline phase and the amorphous phase when a recorded state is used as a parameter.
Figure 4:
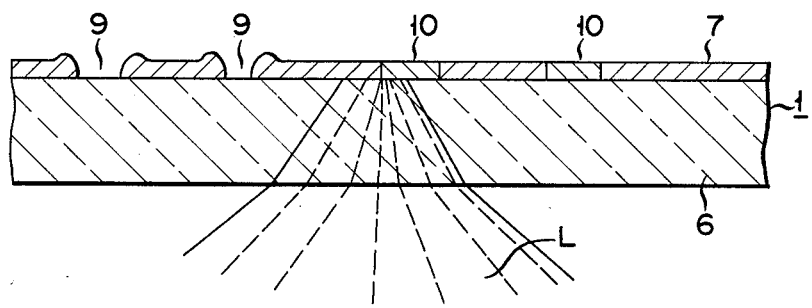
FIG. 4 is a sectional view showing a recorded state of a recording medium for performing recording using crystal phase changes.

FIG. 3 is a graph showing the relationship between the laser power and the laser pulse width in the recording mode for recording information using a transition between the crystalline phase and the amorphous phase when a recorded state is used as a parameter. As is apparent from FIG. 3, the recorded state, i.e., a film state can be changed when the laser power or pulse width of the laser beam is changed. As shown in FIG. 4, in medium 1 prepared by forming recording film 7 on substrate 6, when a dose of laser beam L is sufficiently large, film deformation such as formation of pits, that is, local breakdown occurs, thus forming nonerasable recorded state portion 9 and hence region 4. However, when the dose of beam L is low enough to convert the crystal region of film 7 to an amorphous region, erasable recorded state portion 10 and hence region 3 is formed.

Figure 5:
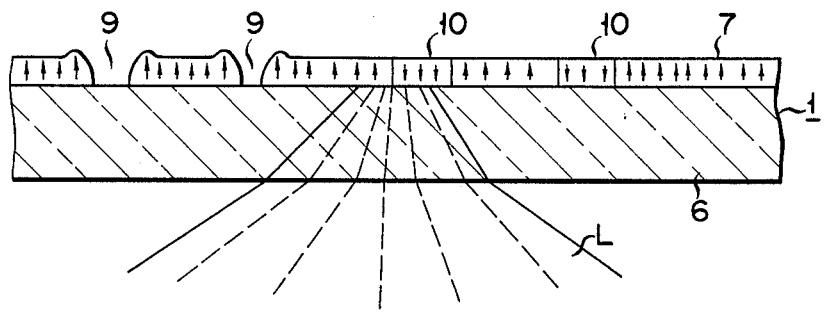
FIG. 5 is a sectional view showing a recorded state of a recording medium for performing recording using a vertical magnetization film.

Furthermore, even when vertical magnetizable recording layer is used as a recording film 7 as shown in FIG. 5, two recording modes are obtained. When a dose of laser beam L is sufficiently large to cause film deformation such as formation of pits (i.e., local film breakdown), nonerasable recorded state portion 9 is formed to provide region 4. However, when the dose of beam L is set to a value enough to cause inversion of the magnetization direction, erasable recorded state portion 10 is formed, thus providing region 3.

Figure 6:
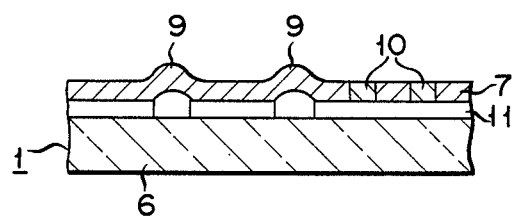
FIG. 6 is a sectional view showing a recorded state of another recording medium for performing recording using crystal phase changes.

It should be noted that the erasable recorded state portion can be formed by locally changing the shape of film 7 as well as by local breakdown of film 7. For example, as shown in FIG. 6, transparent underlying layer 11 may be formed between substrate 6 and recording film 7. In this case, layer 11 is locally exploded or expanded to form a projection and hence portion 9.

Figure 7:
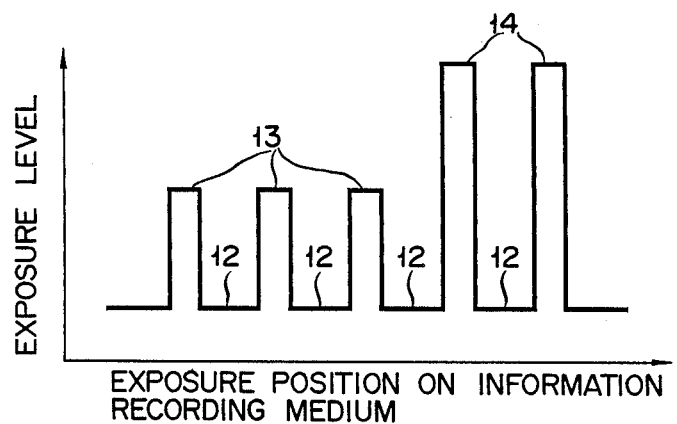
FIG. 7 is a graph showing a relationship between the exposure level and the exposure position on the information recording medium when the exposure level is changed in accordance with recorded states.

An information recording/reproduction system, i.e., an optical head for recording information in a recording layer and reproducing it therefrom will be described when a read laser beam with information read exposure level 12 and first and second write laser beams with nonerasable and erasable recording exposure levels 14 and 13 are used, as shown in FIG. 7.

FIG. 8 shows a schematic system configuration of an information recording/reproduction system for recording information in optical disk (information recording medium) 1 by using crystal phase changes. In this system, disk 1 is driven by a motor (not shown) with respect to an optical head at a constant linear velocity. Disk 1 has a recording medium for recording information using a transition between the crystal phase and the amorphous phase, as shown in FIG. 4. The head is arranged on the rear side of disk 1 to record, reproduce or erase information. The head is arranged as follows. Diverging recording/reproduction pulsed laser beam L1 is generated by semiconductor laser unit 15. In this laser unit, when information is written in film 7 of disk 1, a light intensity is modulated in accordance with information to be written and modulated beam L1 is generated. However, when information is read out from film 7, beam L1 with a constant light intensity is generated. Diverging laser beam L1 from unit 15 is collimated by collimator lens 16 to a parallel beam. The parallel beam is guided to polarization beam splitter 17 and is reflected thereby. The reflected beam passes through $\frac{1}{4}$ wavelength plate 18 and is then incident on objective lens 19. The beam is thus focused by lens 19 to form a beam spot on film 7 of disk 1. Lens 19 is supported to be movable along the optical axis thereof and along a direction perpendicular to the optical axis thereof (i.e., a radial direction of the optical disk). When lens 19 is located at a predetermined position, a beam waist of beam L1 from lens 19 is projected onto the surface of film 7, and then a smallest beam spot is formed on the surface of film 7. In this state, lens 19 is held in the in-focus state and tracked state, so that information can be written or read out. In the information recording mode, intensity-modulated laser beam L1 forms a recording region in a tracking guide on film 7. However, in the information reproduction mode, beam L1 with the constant intensity is intensity-modulated by a pit formed in the tracking guide.

Diverging laser beam L1 reflected by film 7 of medium 1 is converted by lens 19 to a parallel beam when lens 19 is held in the in-focus state. The parallel beam passes through plate 18 and is returned to splitter 17. Upon passing through plate 18 twice, the plane of polarization of beam L1 is rotated by splitter 17 through 90 degrees with respect to a beam reflected by splitter 17. Rotated beam L1 is not reflected by splitter 17 but passes therethrough. Beam L1 is then incident on photo detector 24 through $\frac{1}{4}$ wavelength plate 20, dichroic mirror 21, spherical lens 22, and cylindrical lens 23. Signals from detector 24 are processed (to be described later) to generate an information signal, a tracking error signal, and a focusing error signal.

In the information erase mode, pulsed diverging laser beam L2 is generated by erasure semiconductor laser unit 25. In this case, beam L2 has a predetermined light intensity and has a wavelength different from that of beam L1. Beam L2 from unit 25 is converted by collimator lenses 26, 27 and 28 to form a parallel beam having a diameter smaller than that of beam L1. The focused beam is guided to splitter 17 and is reflected thereby. The reflected beam passes through plate 20 and is guided to mirror 21. Unlike recording/reproduction laser beam L1, erasure laser beam L2 is reflected by mirror 21 and passes again through plate 20. The beam then returns to splitter 17. The laser beam has been transmitted through plate 20 twice and rotated through 90 degrees, so that it is not reflected by splitter 17 but passes therethrough. Beam L2 passing through splitter 17 is incident on lens 19 through plate 18 and is focused by lens 19 to form a beam spot on film 7 of disk 1. In this case, the diameter of the beam spot on film 7 is larger than that of beam L1, thereby erasing the information.

A driver for laser unit 15 will be described hereinafter. One terminal of series circuit 29 consisting of resistor 30-1, FET 31 and resistor 30-2 is connected to DC power source Vcc (not shown) through resistor 30-4. The other terminal of circuit 29 is grounded through unit 15. Circuit 29 is connected in parallel with n-p-n transistor 37 and with series circuit 36 consisting of resistor 30-3 and n-p-n transistor 35. FET 31 is turned on upon reception of gate signal G1 at its gate, and then a laser beam with level 12 (FIG. 7) is generated by unit 15. When base signal B1 is supplied to the base of transistor 37, it is turned on to cause unit 15 to generate a laser beam with level 14 (FIG. 7).

Unit 25 is connected to the power source +Vcc (not shown) through n-p-n transistor 32 and resistor 33. When gate signal G2 is supplied to transistor 32, it is turned on to cause unit 25 to generate the erasure laser beam with level 13 (FIG. 7)

Figure 9:
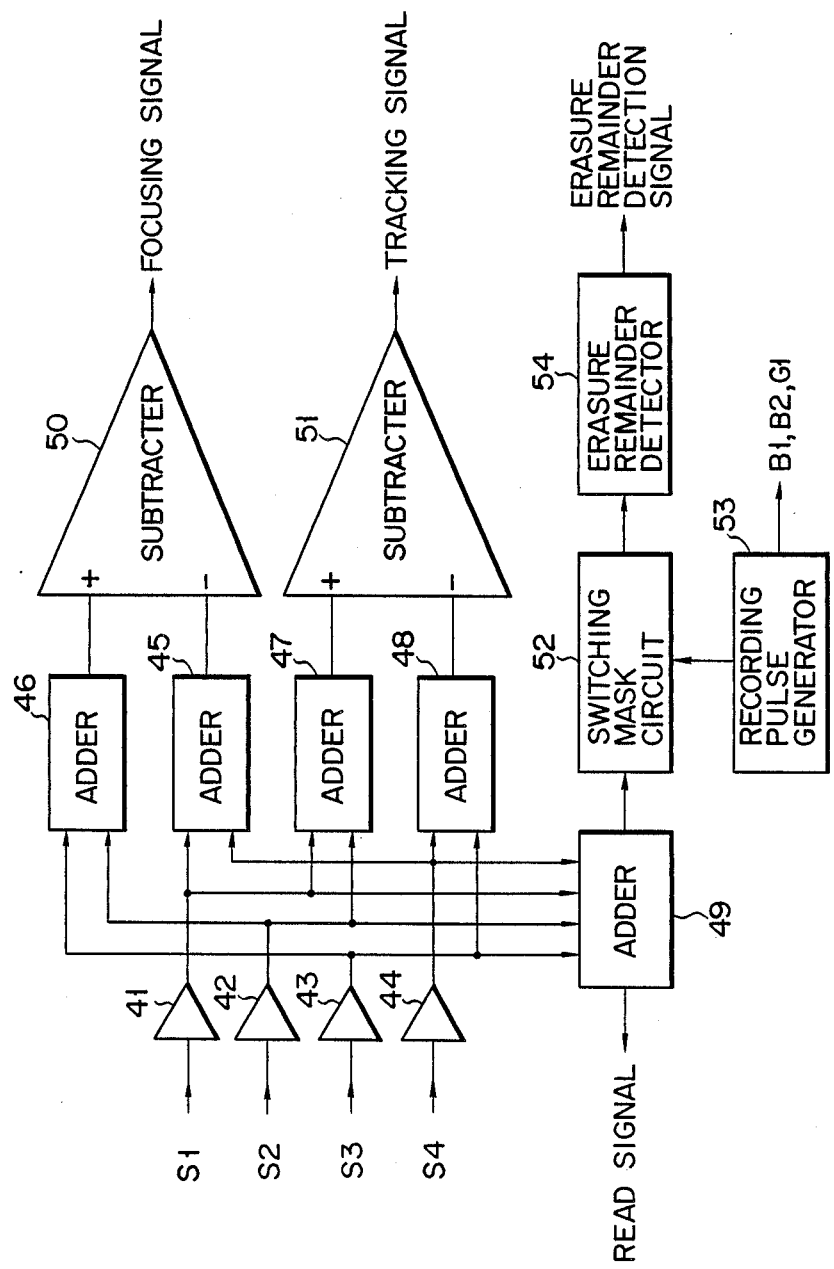
FIG. 9 is a block diagram of a circuit for processing signals detected by a photo detector shown in FIG. 8.

As is well known, photo detector 24 consists of four photo detecting sections which respectively generate detected signals S1, S2, S3 and S4. Signals S1, S2, S3 and S4 are respectively supplied to amplifiers 41, 42, 43 and 44 shown in FIG. 9. Outputs from amplifiers 41 and 44 are supplied to adder 45, and outputs from amplifiers 42 and 43, to adder 46. Outputs from amplifiers 41 and 42 are supplied to adder 47. Outputs from amplifiers 43 and 44 are supplied to adder 48. Furthermore, the outputs from amplifiers 41, 42, 43, and 44 are supplied to adder 49. Outputs from adders 46 and 45 are supplied to subtracter 50. Subtracter 50 calculates the difference between the outputs from adders 46 and 45 to generate a focusing signal representing a focusing error. The outputs from adders 47 and 48 are supplied to subtracter 51. Subtracter 51 calculates the difference between the outputs from adders 47 and 48 to generate a tracking error signal representing a tracking error based on a push-pull method. Adder 49 calculates a sum of the outputs from amplifiers 41, 42, 43, and 44 to generate a read signal to be supplied to a signal processor (not shown).

Figure 10:
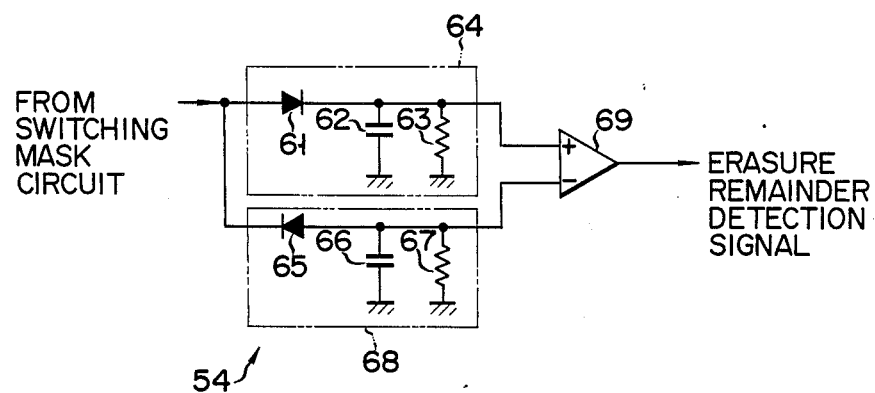
FIG. 10 is a circuit diagram of an erasure remainder detector shown in FIG. 9.

An output from adder 49 is supplied to switching mask circuit 52. Circuit 52 also receives a recording pulse from recording pulse generator 53. Generator 53 generates a recording pulse as base signal B2 in response to the recording signal supplied from a recording signal generator (not shown). In circuit 52, the signal supplied from adder 49 is masked by the recording pulse while the recording pulse is supplied from generator 53, and then the nonmasked signal is sampled and held. The sampled and held signal from circuit 52 is supplied to erasure remainder detector 54. In the re-recording mode, detector 54 detects whether information is recorded in the re-recording portion by determining whether the reproduced signal from the re-recording portion is present between two adjacent recording pulses. Detector 54 has upper envelope detector or first envelope detecting means 64, lower envelope detector or second envelope detecting means 68 and comparator or discriminating means 69, as shown in FIG. 10. Detector 64 has diode 61 with illustrated polarities, capacitor 62 and resistor 63. Detector 68 has diode 65 with illustrated polarities, capacitor 66 and resistor 67. Comparator 69 compares a detection signal from detector 64 with that from detector 68 and generates a signal only when a difference is detected. The signal from comparator 69 serves as the erasure remainder detection signal which is supplied to the recording signal generator (not shown).

Figure 11A:
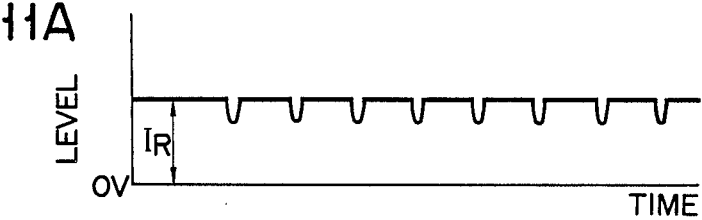
FIG. 11A is a timing chart showing a reproduced signal generated by a reproduced signal generator (not shown)
Figure 11B:
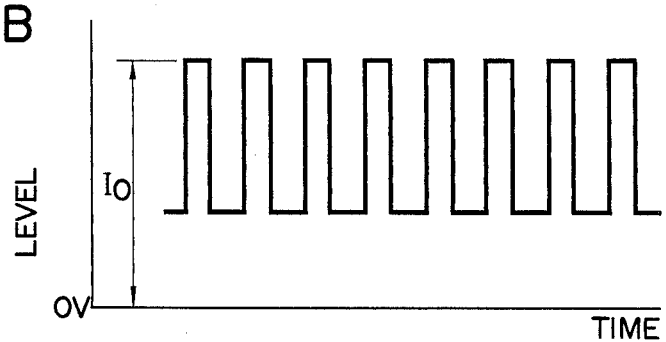
FIG. 11B is a timing chart showing a recording signal generated by a recording signal generator (not shown)

The operation of the system having the arrangement described above will be described hereinafter. In the permanent or nonerasable information recording mode, recording pulse B1 is generated by generator 53 in accordance with the recording data from the recording signal generator (not shown) and is supplied to the base of transistor 37. A high voltage is applied to unit 15. As shown in FIG. 11B, the pulsed laser beam with level 14 (FIG. 7), i.e., the first, or nonerasable recording laser beam is generated by unit 15. This laser beam is collimated by lens 16 and is guided to splitter 17. The beam reflected by splitter 17 passes through plate 18 and is incident on lens 19. The beam is focused by lens 19 to form a beam spot on disk 1. When information is recorded, a nonerasable recording region is formed in a track on disk 1 upon radiation of the laser beam with a high intensity, i.e., the nonerasable recording beam.

In the erasable information recording mode, the recording pulse B2 is also generator 53 in accordance with the recording data and is supplied to the base of transistor 35. Thus, the pulsed laser beam with level 13, i.e., the second or erasable recording laser beam is generated by unit 15. The laser beam is also focused on the disc in the same manner as the nonerasable recording laser beam. Therefore, an erasable recording region is formed in the track by the erasable recording laser beam.

In the recording mode, signal G1 from the reproduction signal generator (not shown) is supplied to the gate of FET 31. A low voltage is then applied to unit 15 in a state excluding the recording state. Excluding the period for which the pulsed recording beam is generated, the laser beam with level 12 (FIG. 7), i.e., reproduction beam is generated by unit 15, as shown in FIG. 11A. This beam is emitted onto disk 1 in the same manner as in the recording beam. The beam reflected by disk 1 is converted by lens 19 to a parallel beam which is then guided to splitter 17 through plate 18. In this case, the laser beam guided to splitter 17 has the plane of polarization rotated through 90 degrees from that of the beam reflected by splitter 17. The rotated laser beam is not reflected by splitter 17 but passes therethrough. Laser beam L1 passing through splitter 17 is incident on detector 24 through plate 20, mirror 21, lens 22 and lens 23. Signals from photo detecting regions of detector 24 are generated and amplified by corresponding amplifiers 41, 42, 43, and 44. Adder 46 calculates a sum of the outputs from second and third photo detecting regions, adder 45 calculates a sum of output signals from the first and fourth photo detecting regions, adder 47 calculates a sum of output signals from the first and second photo detecting regions, and adder 48 calculates detection signals from third and fourth photo detecting regions. Subtracter 50 calculates a difference between output signals from adders 46 and 45 to generate a focusing signal. Subtracter 51 calculates a difference between output signals from adders 47 and 48 to generate a tracking signal.

Information reproduction will be described hereinafter. after. The reproduction signal G1 is generated by the reproduction signal generator (not shown) and is supplied to the gate of FET 31. A low voltage is applied to unit 15. The laser beam with level 12 (FIG. 7), i.e., the reproduction beam is generated by unit 15, as shown in FIG. 11A. The operation is performed in the same manner as in the case wherein the reproduction beam is generated in the recording mode, and focusing and tracking error detection operations are performed. However, adder 49 calculates a sum of signals S1, S2, S3, and S4 which are supplied as the reproduction signals to the signal processor (not shown). The signal processor processes the data in response to the reproduction signal or read signal from the adder 49.

Data erasure will be described. Erasure signal G2 is generated by the erasure signal generator (not shown) and is supplied to the base of transistor 32. A voltage is then applied to unit 25. Diverging laser beam L2 is generated by unit 25. In this case, beam L2 has a predetermined light intensity and a wavelength different from that of beam L1. Beam L2 is collimated by collimator lenses 26, 27 and 28 to form a parallel beam, the spot of which has a diameter smaller than that of beam L1. The parallel beam is guided to splitter 17 and is reflected thereby. The reflected beam passes through plate 20 and is guided to mirror 21. Erasure laser beam L2 has a wavelength different from that of beam L1 and is reflected by mirror 21. The reflected beam passes plate 20 again and is returned to splitter 17. The plane of polarization of the returned beam is rotated through 90 degrees from that of the beam reflected by splitter 17, so that the returned beam is not reflected by splitter 17 but passes therethrough. The beam passing through splitter 17 is incident on lens 19 through plate 18 and is focused by lens 19 to form a beam spot on film 7 in disk 1. In this case, the diameter of the beam L1 spot on film 7 is larger than that of the beam L2 spot, thereby performing information erasure.

Re-recording operation will b described hereinafter. In this case, the recording beam is generated by unit 15. In the same manner as in the recording mode, an erasable recording region is formed in a track on disk 1. The reproduction pulse beam is generated by unit 15 during a rest period between two recording beams. In the same manner as in the recording mode, the beam reproduced from disk 1 is guided to the respective photo detection cells of detector 24. When subtracter 50 calculates a difference between the output signals from adders 46 and 45, a focusing error signal is generated. Furthermore, subtracter 51 calculates a difference between the output signals from adders 47 and 48 to generate a tracking error signal.

Figure 12A:
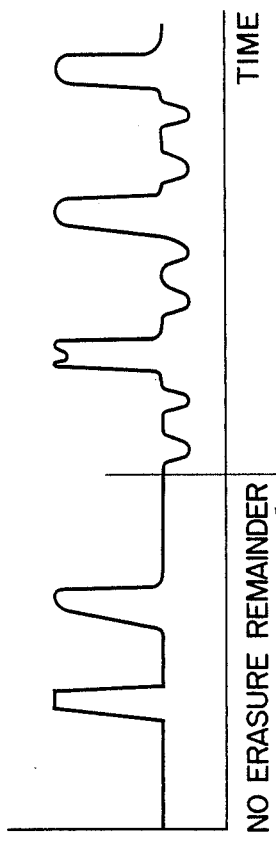
FIGS. 12A to 12C are respectively timing charts of signals generated by an adder, a switching mask circuit and the erasure remainder detector in the arrangement shown in FIG. 8.
Figure 12B:
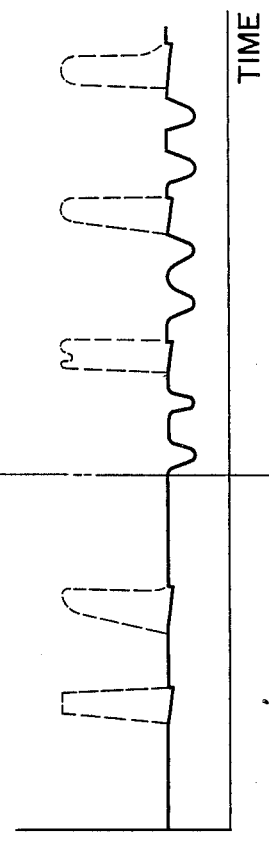
Figure 12C:
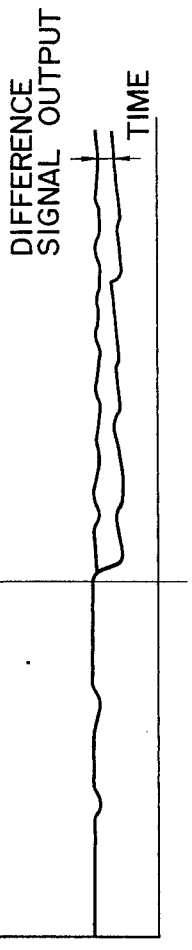

A signal representing a sum of the signals S1, S2, S3, and S4 (FIG. 12A) from adder 49 is supplied to switching mask circuit 52. Circuit 52 receives the recording pulse from generator 53 in the re-recording mode. Excluding the period for which the recording pulse is supplied to circuit 52, the sum signal shown in FIG. 12B is supplied to detector 54. As a result, detector 54 detects the upper and lower envelopes and compares them so as to determine whether or not a difference therebetween is present, as shown in FIG. 12C. When detector 54 detects that no difference is present, it determines that no erasure remainder is present. Otherwise, detector 54 determines that an erasure remainder is present. In this case, an erasure remainder detection signal is supplied to the recording signal generator (not shown). The recording signal generator designates another recording region in response to the erasure remainder detection signal.

In the above embodiment, the system allows detection so as to check whether information is completely erased in the re-recording mode and whether an erasable recording region is present. The system thus records information in the completely erased region or an erasable region, thereby increasing an S/N ratio of the re-recorded portion. The optical system can be made compact and can easily check the erasure remainder or a nonerasable region.

The above embodiment exemplifies the information recording/reproduction system applied to disk 1 for recording information using crystal phase changes. However, the present invention is not limited to this, but can be extended to an information recording/reproduction system applied to disk 1 for recording information using a vertical magnetizable film, as shown in FIG. 13.

Figure 13:
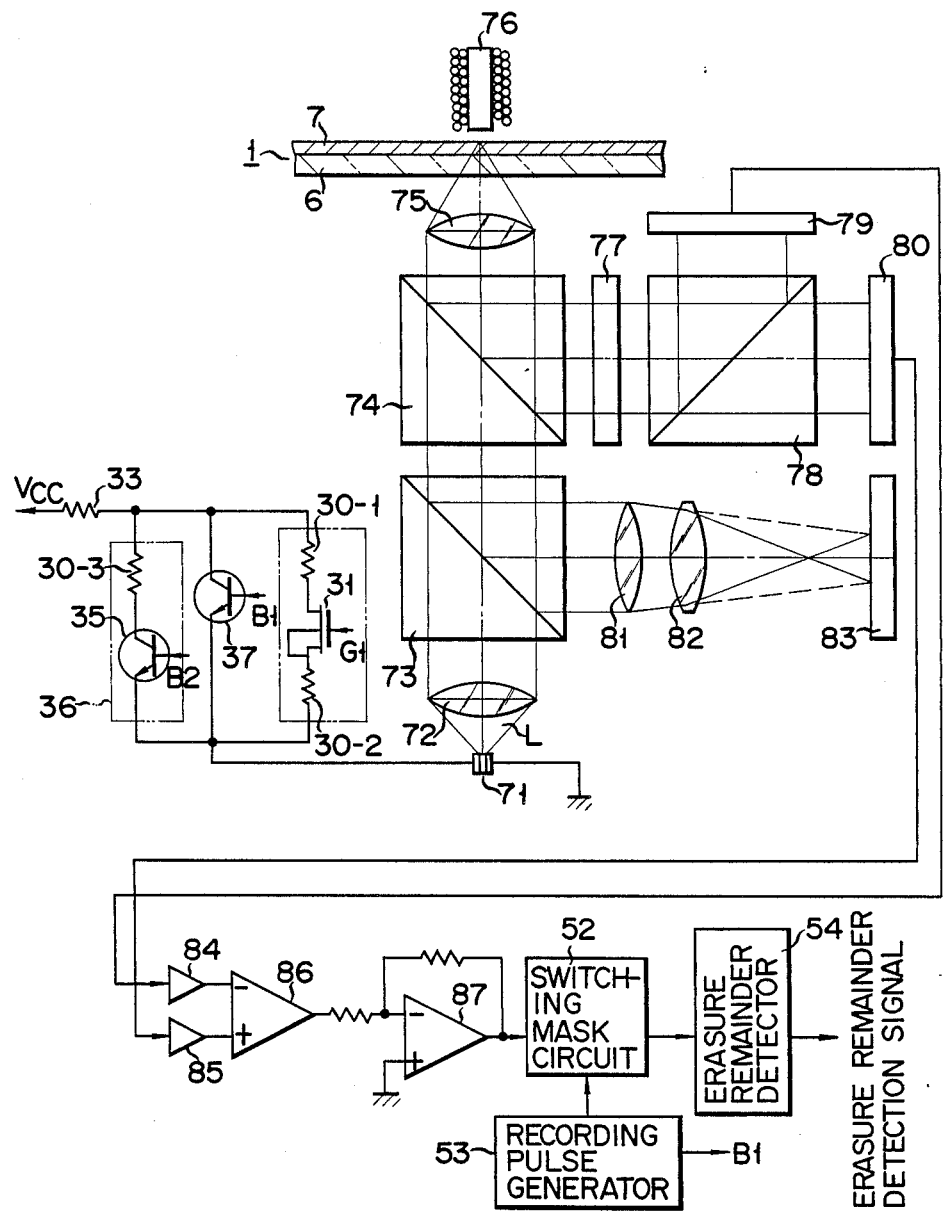
FIG. 13 is a block diagram of an optical head according to another embodiment of the present invention.

In the system shown in FIG. 13, diverging laser beam L is generated by semiconductor laser unit 71. Beam L is collimated by collimator lens 72 to a parallel beam. The parallel beam is incident on objective lens 75 through first and second half prisms 73 and 74 and is focused by lens 75 to form a beam spot on recording film 7 of optical disk 1. When lens 75 is located at a predetermined position, a beam waist of beam L from lens 75 is projected on film 7, so that a smallest beam spot is formed on film 7. Electromagnet 76 is arranged at a surface of disk 1 which is opposite to the radiation surface with beam L.

Beam L reflected by film 7 of disk 1 is converted by lens 75 to a parallel beam in the in-focus state of lens 75. The beam is returned to prism 74 and is split into two beams. Beam L reflected by prism 74 is guided to polarization beam splitter 78 through ½ wavelength plate 77. Beam L reflected by splitter 78 is supplied to first photo detector 79. However, beam L passing through splitter 78 is projected on second photo detector 80. Information reproduction is performed in accordance with the detection results of detectors 79 and 80. Detection signals from detectors 79 and 80 are respectively amplified by amplifiers 84 and 85. Subtracter 86 calculates a difference between output signals from amplifiers 84 and 85. An output from subtracter 86 is supplied to circuit 52 through amplifier 87. An output from circuit 52 is supplied to erasure remainder detector 54. As a result, an envelope of a signal excluding the components corresponding to recording beam radiation among the outputs from subtracter 86 is detected, thereby detecting the erasure remainder or nonerasable region.

In the optical system shown in FIG. 13, diverging laser beam L reflected by film 7 of disk 1 is reflected by half prism 73 and is then directed toward optical systems 81 and 82 for detecting a focusing state and a tracking guide. As is known well, systems 81 and 82 respectively consist of convergent lens 81 and cylindrical lens 82. Beams passing through systems 81 and 82 are converged onto detector 83 and converted to signals S1, S2, S3 and S4. Signals S1, S2, S3 and S4 are processed by the same circuit shown in FIG. 9 and are converted to focus and tracking signals. Lens 75 is always held in the in-focus state in response to the focus signal. The laser beam always traces the tracking guide on the optical disk in response to the tracking signal.

Figure 14:
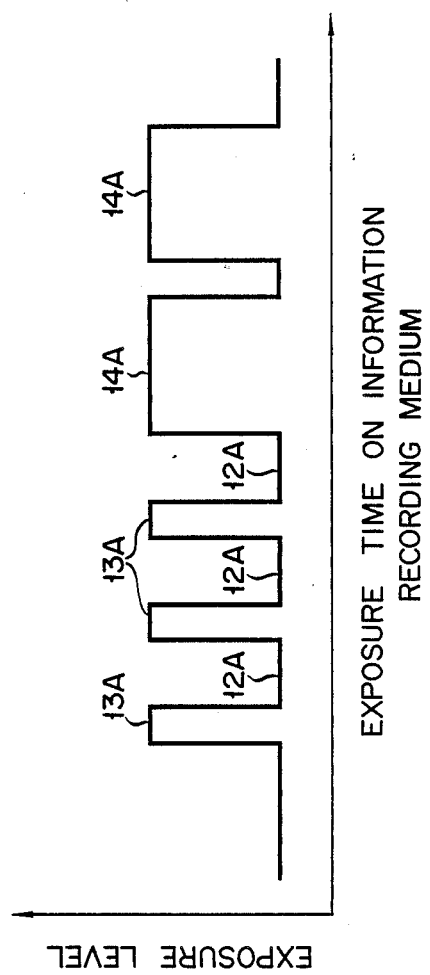
FIG. 14 is a graph showing the relationship between the pulsed laser beam level from a laser beam unit of FIG. 13 as a function of time.

As shown in FIG. 14, two exposure levels, two laser power stages are utilized. A lower exposure level serves as information reproduction level 12A. Higher exposure level is divided into a level with a short period which serves as erasable recording exposure level 13A and a level with a long period which serves as nonerasable recording exposure level 14A. These levels are selectively used to perform information recording, reproduction and erasure. An optical head for performing the above operations with the laser beams will be described below.

FIG. 15 shows an optical head applied to information recording medium 1 for recording information using crystal phase changes.

Figure 16:
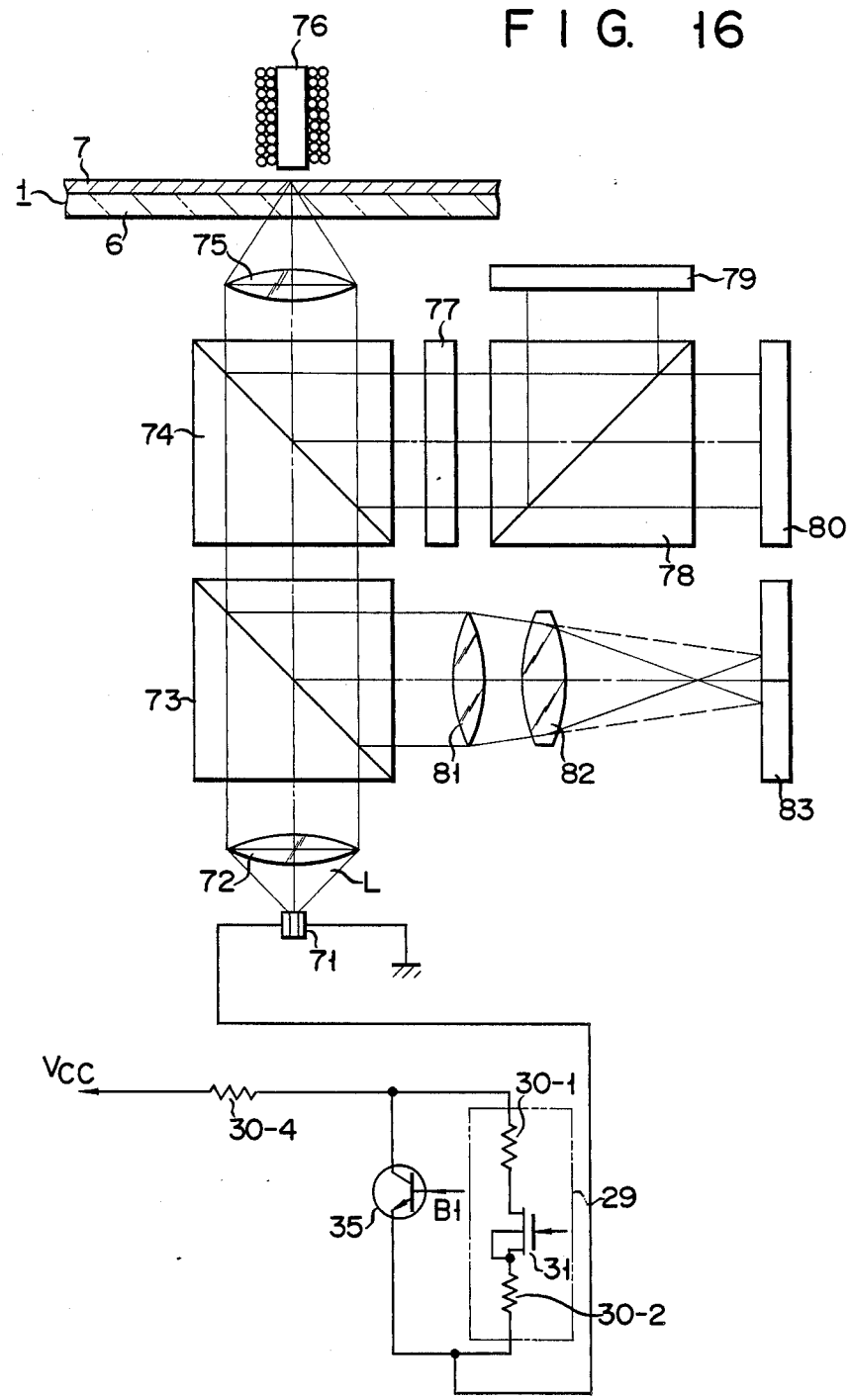

FIG. 16 shows an optical head applied to information recording medium 1 for recording information using a vertically magnetizable film. These optical heads are substantially the same as those in FIGS. 8 and 13, except for the arrangements of drivers. The same reference numerals in FIG. 16 denote the same parts as in FIGS. 8 and 13, and a detailed description thereof will be omitted except for a description of the driver.

Referring to FIGS. 15 and 16, one terminal of series circuit 29 consisting of resistor 30-1, FET 31 and resistor 30-2 is connected to DC power source +Vcc (not shown) through resistor 30-4. The other terminal of circuit 29 is grounded through semiconductor laser unit 15 or 71. Circuit 29 is connected in parallel with npn transistor 35. When gate signal G1 is supplied to the gate of FET 31, it is turned on to generate a signal with information reproduction exposure level 12A. When base signal B1 is supplied to the base of transistor 35, it is turned on. The signal with level 13A or 14A is generated in accordance with the pulse intervals of base signal B1.

In an optical system in FIG. 16, prepits, i.e., track or sector numbers are read out with the erasure laser beam when information is erased, so that information not to be erased will not be erased. In other words, signals S1, S2, S3 and S4 from photo detector 83 are supplied to adder 90 through amplifiers 41, 42, 43 and 44, as shown in FIG. 17. Adder 90 consists of differential amplifier 92 as a DC amplifier, the noninverting input of which is grounded and the inverting input and the output of which are connected to resistor 91. Resistors 93, 94, 95 and 96 connected between the inputs of amplifier 92 and the outputs of amplifiers 41, 42, 43 and 44. A sum signal from amplifier 92 is supplied to variable gain circuit 98. Circuit 98 consists of differential amplifier 103 as a DC amplifier, the non-inverting input of which is grounded and the inverting input and the output of which are connected to a series circuit of variable resistors 100 and 102, resistor 104 connected between amplifier 92 and adder 90, and analog switch 106 connected in parallel with resistor 102. In circuit 98, when switch 106 is turned on/off to change a resistance between the inputs and the output of amplifier 92, its gain is changed. Switch 106 is turned on/off in response to a digital signal from CPU 108. An output signal from circuit 98 is supplied to a digitizer 110, and detected prepit information is digitized. The digital signal is supplied to track number reading circuit 112 and is converted to a track number signal. The track number signal is supplied to discriminator 114 and is compared with the track number signal which represents the track number to be traced with the current laser beam and which is supplied from CPU 108 to discriminator 114. A comparison result is supplied to CPU 108.

In the reproduction mode, since the intensity of reproduction laser beam is lower than that of the recording laser beam, digit "0" from CPU 108 is supplied to switch 106, and switch 106 is turned off. Therefore, the sum output is amplified by circuit 98 at a relatively large gain. The amplified sum output is digitized by digitizer 110. When the digital signal from digitizer 110 coincides with the signal supplied from CPU 108 to discriminator 114, the reproduction laser beam is properly directed to the reproduction area of the optical disk, and thus information is continuously reproduced from the optical disk. However, when a noncoincidence signal from discriminator 114 is supplied to CPU 108, the laser beam is directed to an optical disk region which is not subjected to reproduction. In this case, information reproduction is stopped. The track of the optical disk is searched with a laser beam in response to a seek signal from CPU 108 until the coincidence signal is generated by discriminator 114.

In the erasure mode, digit "1" from CPU 108 is supplied to switch 106, and switch 106 is turned off. The su output is amplified by circuit 98 at a relatively small gain. The sum output substantially having the same level as in the reproduction mode is supplied to digitizer 110. Even in the erasure mode, the track number of the track region (i.e., the region specified by the track number for the start of erasure) reproduced with the erasure laser beam is compared by discriminator 114 with the track number for specifying the area to be erased. When a coincidence signal is generated by discriminator 114, information erasure is started or continued with the erasure laser beam. However, when a noncoincidence signal is generated by discriminator 114, erasure is stopped, and the region to be erased is searched in the same manner as in the reproduction mode.

In the embodiment shown in FIG. 17, the erasure region even in the erasure mode is checked whether or not it is the proper erasure region. Therefore, information stored in a nonerasure region is not accidentally erased.

A base or gate signal from CPU 108 in FIG. 17 may be supplied to transistor 37 or 32 or FET 31 through an interface (not shown) in accordance with the reproduction, erasure, or recording mode.

In the embodiment shown in FIG. 8, the laser beam reflected from the optical disk 1 is detected by the photo detector 24. However, the laser beam passing through the optical disk 1 may be detected by the photo detector 24, when the optical disk 1 is formed of a transparent substrate 7 and a recording film 7 having transparent and opaque regions.

In the embodiment shown in FIG. 8, the recording laser beams for forming the permanent and erasable recorded regions are emitted from the single laser unit 15. However, two laser units for emitting recording laser beams respectively may be used. In this modified embodiment, two laser beams are transferred to the same optical path by a half mirror (not shown) and form the permanent and erasable recorded regions on the optical disk 1.

According to the present invention as described above, the information recording medium for performing at least recording and reproduction with a converged beam has a first recording region as an erasable information region and a second recording region as a nonerasable information region. Therefore, erasable information and nonerasable information can be recorded in a single recording medium.

What is claimed is:

1. An optical system for recording information on an erasable recording medium, comprising:
    a laser diode for selectively emitting first, second and third light beams having different first, second and third intensity levels;
    means for directing the light beams from said laser diode toward said recording medium; and
    means for selectively generating first, second and third energizing current signals having different levels, to energize said laser diode, which includes a current source, first, second and third switching elements connected between said laser diode and the current source, and resistors connected to the second and third switching elements, the first, second and third switching elements being selectively closed to supply one of the first, second and third energizing current signals to said laser diode the first energizing current signal being supplied to said laser diode to cause said laser diode to emit the first beam so as to form a permanent recording region on said recording medium, the second energizing current signal being supplied to said laser diode to cause said laser diode to emit the second light beam so as to form an erasable recording region, and the third energizing current signal being supplied to said laser diode to cause said laser diode to emit the third light beam so as to retrieve information from the permanent recording region and the erasable recording region.

2. A system according to claim 1, further comprising: means for detecting the light beams; and
transferring means for transferring the light beams from said emitting means to said directing means and for transferring the light beams from said recording medium to said detecting means.

3. A system according to claim 1, wherein the first light beam has an intensity level higher than that of the second light beam.

4. A system according to claims 1, wherein the erasable recording medium is made of a material subjected to a phase transition between a crystal phase and an amorphous phase upon radiation of the light beams.

5. A system according to claim 2, wherein said energizing means includes:
means for generating the first and second energizing signals in response to the recording signal and
means for generating, from a signal reproduced by said detecting means, an erasure remainder signal representative of the degree of erasure of signals previously recorded on the recording medium; and
means for discriminating, in response to the erasure remainder signal, whether previously recorded signals remain on said recording medium.

6. A system according to claim 1, wherein said erasable recording medium has prerecording regions for permanently recording preinformation for specifying recording and reproduction regions.

7. A system according to claim 6, wherein said detecting means includes means for detecting the third light beam transferred from said recording medium and for reproducing the preinformation recorded in said prerecording regions.

8. A system according to claim 5, wherein said detecting means includes means for generating a signal substantially having a predetermined level when the first and second light beams are detected.

9. A system according to claim 1, wherein said erasable recording medium comprises:
a nonerasable recording region responsive to a light beam of a first exposure level to cause a mechanical deformation; and
an erasable recording region responsive to a light beam of a second exposure level to undergo a phase transition of the recording medium.

* * * * *